United States Patent [19]
Takenaka et al.

[11] Patent Number: 6,064,167
[45] Date of Patent: May 16, 2000

[54] CONTROL SYSTEM FOR CONTROLLING THE KNEE JOINT ACTUATORS OF A LEGGED ROBOT IN RESPONSE TO A DETECTED FALL CONDITION SO AS TO LOWER THE CENTER OF GRAVITY OF THE ROBOT

[75] Inventors: Toru Takenaka; Takayuki Kawai; Tadaaki Hasegawa; Takashi Matsumoto, all of Wako, Japan

[73] Assignee: Honda Giken Kogyo Kabushiki Kaisha, Tokyo, Japan

[21] Appl. No.: 09/123,695

[22] Filed: Jul. 28, 1998

[30] Foreign Application Priority Data

Aug. 4, 1997 [JP] Japan .................................... 9-209306

[51] Int. Cl.[7] ...................................................... B25J 5/00
[52] U.S. Cl. .......................................... 318/568.12; 901/1
[58] Field of Search .......................... 318/568.11, 568.12, 318/568.17, 568.18, 568.13, 587, 565; 901/1, 2, 9, 12, 15, 18, 20, 21, 22, 24, 44, 47, 48; 180/8.1–8.6, 167, 169; 414/732, 735; 364/424.02, 424.01, 149, 150, 151, 161

[56] References Cited

U.S. PATENT DOCUMENTS

| | | | |
|---|---|---|---|
| 5,221,883 | 6/1993 | Takenaka et al. | 318/568.12 |
| 5,357,433 | 10/1994 | Takenaka et al. | 364/424.027 |
| 5,459,659 | 10/1995 | Takenaka | 395/95 |
| 5,513,106 | 4/1996 | Yoshino et al. | 364/424.027 |
| 5,739,655 | 4/1998 | Torii et al. | 318/568.12 |
| 5,808,433 | 9/1998 | Tagami et al. | 318/568.12 |
| 5,842,533 | 12/1998 | Takeucki | 180/8.1 |

FOREIGN PATENT DOCUMENTS

| | | |
|---|---|---|
| 10086081 | 4/1998 | Japan . |
| 10277969 | 10/1998 | Japan . |
| WO98/33629 | 6/1998 | WIPO . |

*Primary Examiner*—Jonathan Salata
*Attorney, Agent, or Firm*—Lahive & Cockfield, LLP

[57] ABSTRACT

A legged moving robot has a plurality of movable legs extending downwardly from an upper body and having actuators associated respectively with joints thereof. A fall judging unit decides whether the robot is likely to fall down while the robot is operating. An actuator controller controls the actuators associated respectively with the joints of the movable legs to lower the center of gravity of the robot when the fall judging unit determines that the robot is likely to fall down.

11 Claims, 9 Drawing Sheets

FIG. 6
TARGET MOTION PATTERN
(WHEN ROBOT LOWERS WAIST WHILE WALKING)
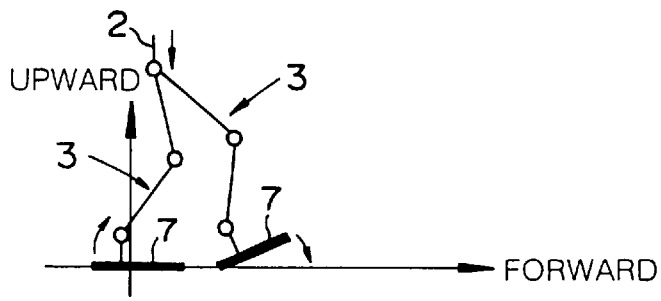
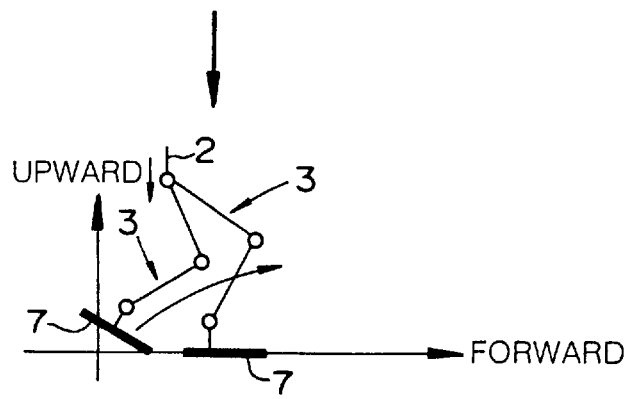
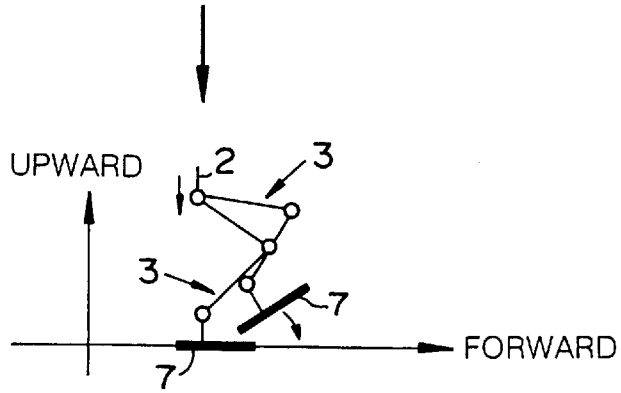
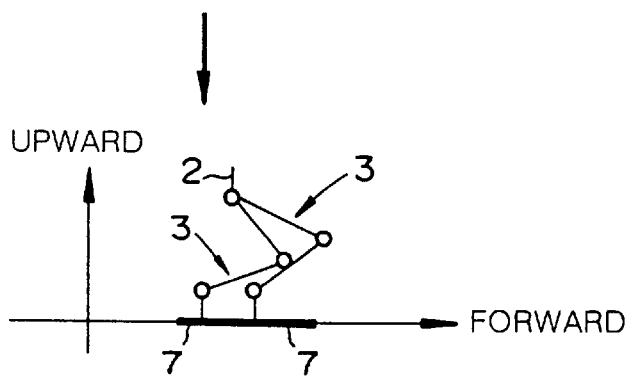

TARGET MOTION PATTERN
(WHEN ROBOT LOWERS WAIST WHILE STANDING STILL)

CONTROL SYSTEM FOR CONTROLLING THE KNEE JOINT ACTUATORS OF A LEGGED ROBOT IN RESPONSE TO A DETECTED FALL CONDITION SO AS TO LOWER THE CENTER OF GRAVITY OF THE ROBOT

BACKGROUND OF THE INVENTION

1. Field of the Invention

The present invention relates to a control system for controlling a legged moving robot.

2. Description of the Prior Art

Legged moving robots such as two-legged (biped) locomotion robots may well have a chance to fall down for various reasons because they move by landing and lifting a plurality of movable legs while supporting themselves on a floor with the movable legs, unlike industrial robots that are installed in fixed positions on the floor.

If a legged moving robot is subject to unexpected external forces due to a collision with an object while the legged moving robot is moving or standing still, or is brought out of balance by stepping on an unexpected bump or into a recess while the legged moving robot is moving, then the legged moving robot may fall down because its upper body cannot sufficiently be supported stably on movable legs thereof.

The applicant has proposed a biped locomotion robot which has a function to stabilize its own orientation autonomously (see, for example, Japanese patent application No. 9-33176 or PCT international application PCT/JP98/0399). Even the proposed biped locomotion robot may fall down when it is pushed excessively out of balance by unexpected external forces.

Some legged moving robots have electric actuators combined with respective joints of movable legs and energizable by a battery. If the remaining capacity of the battery becomes too low, then the battery fails to energize the electric actuators and hence to move the movable legs as required, and the robot tends to fall down.

If actuators for movable legs fail or sensors for controlling operation of such actuators fail while the legged moving robot is in operation, then the actuators and hence the movable legs fail to operate as required, resulting in a fall of the robot.

For the reasons described above, it is possible for the legged moving robots to fall down. Since the legged moving robots are generally heavy, when they fall down, they tend to be damaged or they tend to cause damage to an object that is hit by the robots. Particularly, inasmuch as the upper body of a biped locomotion robot is relatively high in position when it is moving or standing still, the damage which the robot or an object hit thereby suffers when the robot turns over is liable to be substantial.

Therefore, it is desirable for legged moving robots to minimize any damage which the robot or an object hit thereby suffers when the robot turns over.

SUMMARY OF THE INVENTION

It is therefore an object of the present invention to provide a control system for controlling a legged moving robot to minimize any damage which the robot or an object hit thereby suffers when the robot turns over in situations where the robot is likely to fall down.

To achieve the above object, there is provided in accordance with the present invention a control system for controlling a legged moving robot having a plurality of movable legs extending downwardly from an upper body and having actuators associated respectively with joints thereof, comprising fall judging means for deciding whether the robot is likely to fall down while the robot is operating, and actuator control means for controlling the actuators associated respectively with the joints of the movable legs to lower the center of gravity of the robot when the fall judging means determines that the robot is likely to fall down.

When the fall judging means determines that the robot is likely to fall down, the actuator control means controls the actuators associated respectively with the joints of the movable legs to lower the center of gravity of the robot. Therefore, the possibility of a fall of the robot is reduced. Even if the robot subsequently turns over, any damage that the robot may suffer is relatively small, and any damage to an object such as a floor which may be hit by the robot when the robot turns over is also relatively small.

Consequently, when the robot turns over, the robot suffers relatively small damage, and an object which may be hit by the robot when the robot turns over also suffers relatively small damage.

If the robot has a battery, and each of the actuators comprises an electric actuator energizable by the battery, then the control system further comprises remaining capacity recognizing means for recognizing a remaining capacity of the battery, and the fall judging means comprises means for determining that the robot is likely to fall down when the remaining capacity of the battery as recognized by the remaining capacity recognizing means is lower than a predetermined level.

When the remaining capacity of the battery becomes low, the electric actuators which are energizable by the battery may not be operated as desired, tending to cause a fall of the robot. In view of such a difficulty, when the remaining capacity of the battery as recognized by the remaining capacity recognizing means is lower than the predetermined level, and hence is relatively small, the fall judging means determines that the robot is likely to fall down, for thereby enabling the actuator control means to control the actuators with accurate timing to lower the center of gravity of the robot in preparation for a fall of the robot. Since the actuators are controlled to lower the center of gravity of the robot, the potential energy of the robot is reduced, and the total amount of electric energy needed to operate the actuators is reduced, lowering the burden on the battery. Therefore, the actuators may be controlled to lower the center of gravity of the robot in preparation for a fall of the robot even when the remaining capacity of the battery is small.

Inasmuch as the potential energy of the robot is reduced when the actuators are controlled to lower the center of gravity of the robot, some of the electric actuators operate in a regenerative mode.

Each of the electric actuators is connected to the battery such that electric energy regenerated by the electric actuators when the electric actuators are controlled by the actuator control means to lower the center of gravity of the robot is supplied to charge the battery.

Accordingly, when the remaining capacity of the battery drops below the predetermined level, the capacity of the battery increases to a certain extent by the regenerated electric energy from the actuators. The actuators can thus be operated to lower the center of gravity of the robot as sufficiently as possible. Even if the robot subsequently turns over, any damage caused to the robot and objects hit thereby is minimized.

More preferably, a capacitor is connected between the anode and cathode of the battery through a diode connected to prevent a current from flowing from the capacitor into the battery, and each of the electric actuators is connected to the capacitor such that electric energy regenerated by the electric actuators when the electric actuators are controlled by the actuator control means to lower the center of gravity of the robot is stored in the capacitor.

When the regenerated electric energy is supplied to charge the battery, if the remaining capacity of the battery is greatly lowered, most of the regenerated electric energy is consumed by the battery, and a required amount of electric energy cannot be supplied to the actuators for lowering the center of gravity of the robot. To eliminate this drawback, the regenerated electric energy is stored in the capacitor connected between the anode and cathode of the battery through the diode. Since the regenerated electric energy stored in the capacitor is not consumed by the battery, the stored regenerated electric energy can effectively be used to energize the actuators to lower the center of gravity of the robot.

The control system further comprises non-volatile memory means on the robot or memory means external to the robot, and operation status outputting means for outputting, to the memory means, operation status data of the robot immediately before or across a time when the actuator control means controls the actuators to lower the center of gravity of the robot.

With such an arrangement, the operation status data of the robot immediately before the actuator control means controls the actuators to lower the center of gravity of the robot with the regenerated electric energy is stored in the memory means on the robot or the memory means external to the robot. Since the operation status data of the robot is stored, it is possible to operate the robot from the previous operation status after the robot has recovered its normal operational conditions. The operation status data stored in the memory means may be employed to analyze the cause of a malfunction or failure of the robot.

The control system further comprises device malfunction monitoring means for monitoring devices on the robot for malfunctioning, and the fall judging means comprises means for determining that the robot is likely to fall down when any one of the devices on the robot is recognized by the device malfunction monitoring means.

When any one of the devices fails to operate, e.g., any one of the actuators suffers a failure, or any one of sensors on the robot suffers a failure, or any of electric wires on the robot is disconnected or broken, the actuators cannot be operated normally, tending to cause the robot to fall down. Therefore, when any one of the devices on the robot is recognized by the device malfunction monitoring means, the fall judging means determines that the robot is likely to fall down, for thereby enabling the actuator control means to control the actuators with accurate timing to lower the center of gravity of the robot in preparation for a fall of the robot.

The control system may further comprise upper body tilted orientation detecting means for detecting a tilted orientation of the upper body of the robot, and upper body orientation deviation calculating means for calculating a deviation between the tilted orientation of the upper body of the robot as detected by the upper body tilted orientation detecting means and a target tilted orientation for the upper body of the robot which is established to cause the robot to effect a predetermined motion, the fall judging means comprising means for determining that the robot is likely to fall down when the deviation as calculated by the upper body orientation deviation calculating means is greater than a predetermined value.

Alternatively, the fall judging means may comprise means for determining that the robot is likely to fall down when a rate of change in time of the deviation as calculated by the upper body orientation deviation calculating means is greater than a predetermined value in a direction for the tilted orientation of the upper body of the robot to deviate from the target tilted orientation.

Further alternatively, the fall judging means may comprise means for determining that the robot is likely to fall down when the value of a weighted mean of the deviation as calculated by the upper body orientation deviation calculating means and a rate of change in time of the deviation is greater than a predetermined value.

If the deviation as calculated by the upper body orientation deviation calculating means is greater than the predetermined value, then the upper body of the robot is tilted excessively from an orientation which the upper body of the robot should achieve. If a rate of change in time of the deviation as calculated by the upper body orientation deviation calculating means is greater than a predetermined value in a direction for the tilted orientation of the upper body of the robot to deviate from the target tilted orientation, then the orientation of the upper body of the robot is rapidly deviating from an orientation to be achieved by the upper body of the robot should achieve under unexpected external forces. In these situations, the orientation of the robot tends to be brought out of balance, and the robot is likely to fall down. Therefore, when the deviation, or its rate of change in time, or the value of their weighted mean becomes greater than a predetermined value, it is determined that the robot is likely to fall down, for thereby enabling the actuator control means to control the actuators with accurate timing to lower the center of gravity of the robot in preparation for a fall of the robot.

The control system may further comprise upper body tilted orientation detecting means for detecting a tilted orientation of the upper body of the robot, upper body orientation deviation calculating means for calculating a deviation between the tilted orientation of the upper body of the robot as detected by the upper body tilted orientation detecting means and a target tilted orientation for the upper body of the robot which is established to cause the robot to effect a predetermined motion, orientation stabilization floor reactive force calculating means for calculating a floor reactive force to be applied from a floor to the robot through the movable legs to return the tilted orientation of the upper body of the robot to the target tilted orientation based on the deviation as calculated by the upper body orientation deviation calculating means, and foot position/orientation correcting means for correcting a position and/or an orientation of each of feet of the movable legs based on the floor reactive force as calculated by the orientation stabilization floor reactive force calculating means, the fall judging means comprising means for determining that the robot is likely to fall down when the floor reactive force as calculated by the orientation stabilization floor reactive force calculating means is greater than a predetermined value.

Based on the deviation between the tilted orientation of the upper body of the robot and the target tilted orientation, the orientation stabilization floor reactive force calculating means calculates a floor reactive force to be applied from a floor to the robot through the movable legs to return the tilted orientation of the upper body of the robot to the target tilted orientation. Based on the determined floor reactive force, the foot position/orientation correcting means basically corrects a position and/or an orientation of each of feet of the movable legs for the robot to stabilize its own orientation autonomously. If the floor reactive force is excessive, then it means that the position and/or the orientation of each of feet of the movable legs needs to be greatly corrected for stabilizing the orientation of the robot, or that the orientation of the robot is so unbalanced that the orientation of the robot cannot practically be restored to a stable orientation. Therefore, when the floor reactive force is greater than the predetermined value, it is determined that the robot is likely to fall down, for thereby enabling the actuator control means to control the actuators with accurate timing to lower the center of gravity of the robot in preparation for a fall of the robot.

The robot has a movable arm with an actuator associated with a joint thereof, and the control system further comprises means for controlling the actuator of the movable arm to bring the movable arm into touch with a floor when the fall judging means determines that the robot is likely to fall down.

In situations tending to cause a fall of the robot, the movable legs are operated to lower the center of gravity of the robot, and at the same time, the movable arm is operated to touch the floor. Consequently, any damage which the robot and objects hit thereby may suffer when the robot turns over is further effectively reduced.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a diagram of a target motion pattern for the robot shown in FIG. 1 when it is in a situation likely to cause the robot to fall down;

DETAILED DESCRIPTION OF THE PREFERRED EMBODIMENTS

Figure 1:
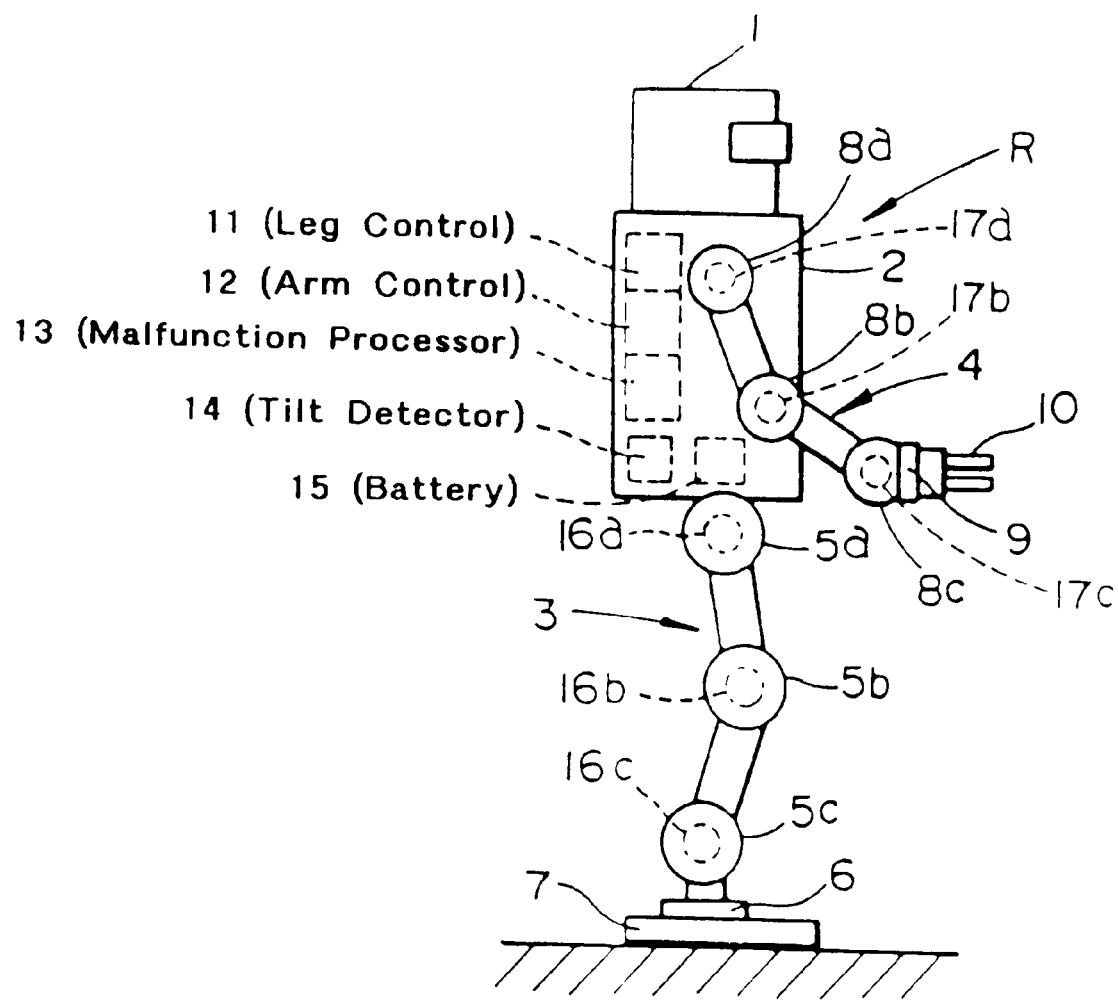
FIG. 1 is a schematic side elevational view of a legged moving robot, i.e., a biped locomotion robot, which is controlled by a control system according to a first embodiment of the present invention.

Like or corresponding parts are denoted by like or corresponding reference characters throughout views.

FIG. 1 shows a two-legged moving robot, i.e., a biped locomotion robot according to a first embodiment of the present invention.

As shown in FIG. 1, the biped locomotion robot, generally denoted by R, comprises a torso 2 (upper body of the robot) supporting a head 1 on its upper end, a pair of legs 3 (only one shown) extending downwardly from a lower end of the torso 2, and a pair of arms 4 (only one shown) extending from respective upper lateral sides of the torso 2.

Each of the legs 3 has a hip joint actuator 5a at a hip joint between the torso 2 and the leg 3, a knee joint actuator 5b at a knee joint, and an ankle joint actuator 5c at an ankle joint. A foot 7 for contacting a floor is operatively connected through a six-axis force sensor 6 to a lower end of the ankle joint actuator 5c.

The hip joint actuator 5a serves to rotate the leg 3 about three axes, i.e., a sagittal axis, a lateral axis, and a vertical axis, and comprises three electric motors (electric actuators, not shown in FIG. 1). The knee joint actuator 5b serves to rotate the leg 3 about the lateral axis, and comprises an electric motor (not shown in FIG. 1). The ankle joint actuator 5c serves to rotate the leg 3 about the sagittal axis and the lateral axis, and comprises two electric motors (not shown in FIG. 1). The hip, knee, and ankle joint actuators 5a, 5b, 5c are activated to move the leg 3 in a manner similar to the legs of human beings. The six-axis force sensor 6 serves to detect forces acting on the foot 7, i.e., force (translational force) components applied to the robot R along the sagittal, lateral, and vertical axes, and moments generated about these axes.

Each of the arms 4 has a shoulder joint actuator 8a at a shoulder joint between the torso 2 and the arm 4, an elbow joint actuator 8b at an elbow joint, and a wrist joint actuator 8c at a wrist joint. A hand 10 is operatively connected through a six-axis force sensor 9 to the wrist joint actuator 8c.

The shoulder joint actuator 8a serves to rotate the arm 4 about the sagittal axis, the lateral axis, and the vertical axis. The elbow joint actuator 8b serves to rotate the arm 4 about the lateral axis. The wrist joint actuator 8c serves to rotate the arm 4 about the sagittal axis, the lateral axis, and the vertical axis. As with the actuators 5a–5c of each of the movable legs 3, each of the actuators 8a–8c comprises as many electric motors (not shown in FIG. 1) as the number of degrees of freedom for rotating the arm 4.

The torso 2 houses therein a robot leg control unit 11 for activating and controlling the actuators 5a–5c of each of the movable legs 3 (actuator control means for the movable legs 3), a robot arm control unit 12 for activating and controlling the actuators 8a–8c of each of the arms 4, a malfunction processing unit 13 for processing a malfunction in a situation tending to cause the robot R to fall down, a tilt detector 14 including an accelerator sensor and a rate gyro (not shown) for detecting a tilted orientation (tilt angle) of the upper body of the robot R (upper body tilted orientation detecting means), and a battery 15 as a power supply for various electronic units on the robot R, which include the actuators 5a–5c, 8a–8c, the robot leg control unit 11, the robot arm control unit 12, the malfunction processing unit 13, etc. Each of the robot leg control unit 11, the robot arm control unit 12, and the malfunction processing unit 13 comprises a microcomputer. The robot leg control unit 11, the robot arm control unit 12, and the malfunction processing unit 13 jointly make up a control system according to the first embodiment of the present invention.

The actuators 5a–5c are associated respectively with actuator displacement detectors 16a–16c for detecting angular displacements of the respective actuators 5a~5c about the appropriate axes. Specifically, the actuator displacement detectors 16a~16c comprise respective encoders for detecting angular displacements of the electric motors of the respective actuators 5a~5c. Similarly, the actuators 8a~8c are associated respectively with actuator displacement detectors 17a–17c for detecting angular displacements of the respective actuators 8a~8c about the appropriate axes.

The actuators 5a~5c that are associated with the legs 3 will hereinafter also be referred to collectively as leg actuators 5, and the corresponding actuator displacement detectors 16a~16c as leg actuator displacement detectors 16. Likewise, the actuators 8a~8c that are associated with the arms 4 will hereinafter also be referred to collectively as arm actuators 8, and the corresponding actuator displacement detectors 17a~17c as arm actuator displacement detectors 17.

Figure 2:
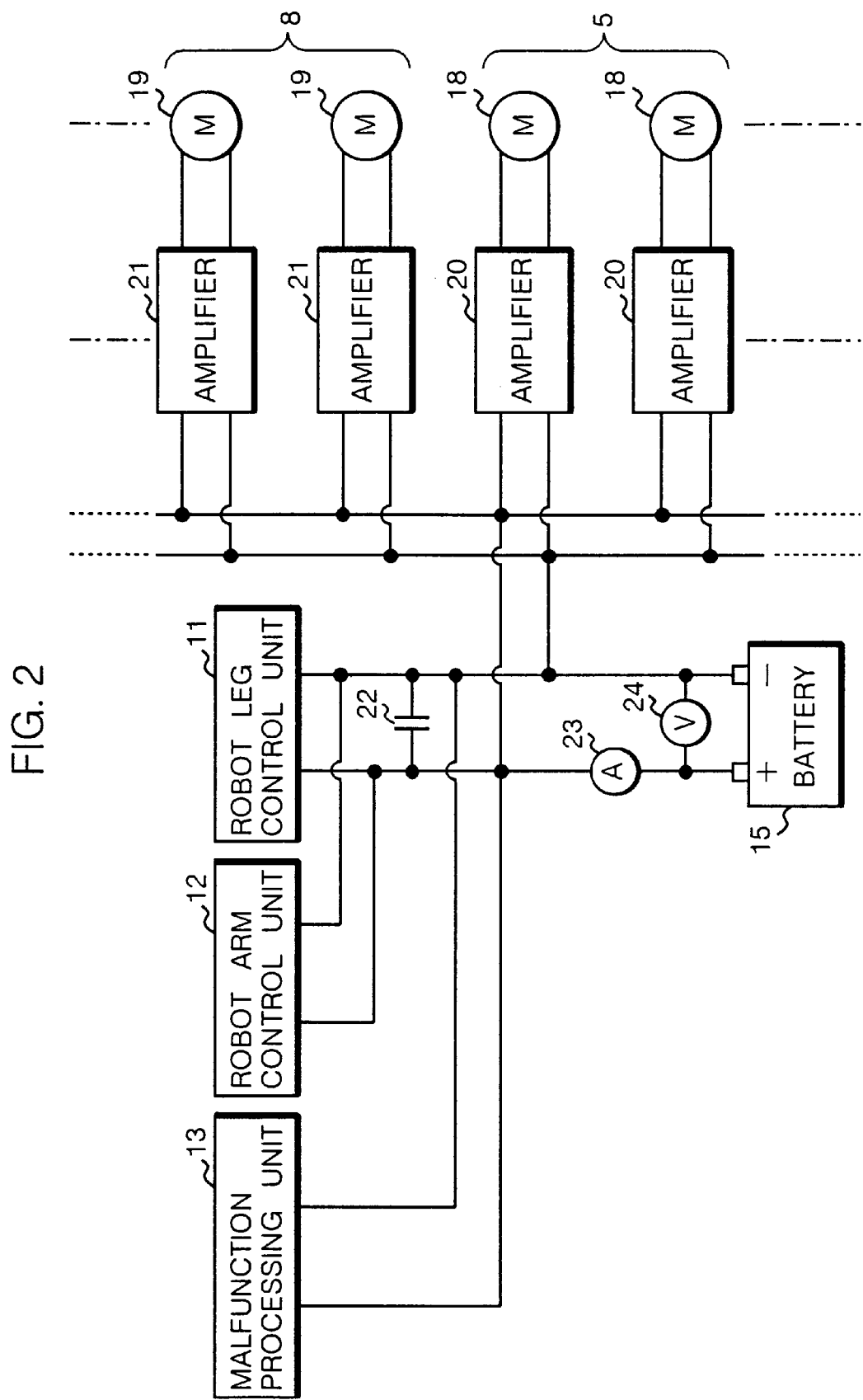
FIG. 2 is a block diagram of an electrically connected arrangement of a battery, amplifiers, electric motors, etc. of the robot shown in FIG. 1.

The battery 15 is electrically connected to the leg actuators 5, the arm actuators 8, the robot leg control unit 11, the robot arm control unit 12, and the malfunction processing unit 13, as shown in FIG. 2.

More specifically, in FIG. 2, the leg actuators 5 comprise a plurality of electric motors (six electric motors in this embodiment) 18, and the arm actuators 8 comprise a plurality of electric motors (six electric motors in this embodiment) 19. These electric motors 18, 19 are connected through respective amplifiers 20, 21 between the anode and cathode of the battery 15. The robot leg control unit 11, the robot arm control unit 12, and the malfunction processing unit 13 are also connected between the anode and cathode of the battery 15, so that they can be energized by the battery 15.

The amplifiers 20, 21 connected between the electric motors 18, 19 and the battery 15 serve to drive the electric motors 18, 19 according to drive commands supplied from the robot leg control unit 11 and the robot arm control unit 12, respectively. When the electric motors 18, 19 operate in a usual mode, i.e., when they rotate in the same direction as the torque which they generate or when they are not in their rotating operation, the amplifiers 20, 21 supply the electric energy stored in the battery 15 to the electric motors 18, 19. When the electric motors 18, 19 operate in a regenerative mode, i.e., when they rotate in a direction opposite to the direction of the torque which they generate due, for example, to the weight of the robot R, the amplifiers 20, 21 return the regenerated electric power from the electric motors 18, 19 to the battery 15.

A capacitor 22 is also connected between the anode and cathode of the battery 15. The capacitor 22 is charged by the stored electric energy from the battery 15 or the regenerated electric power from the electric motors 18, 19, and serves to stabilize the voltage of the electric energy supplied to the electric motors 18, 19, the robot leg control unit 11, the robot arm control unit 12, and the malfunction processing unit 13.

A current detector 23 for detecting a current (including its direction, hereinafter referred to as a battery current) flowing through the battery 15 is connected in a circuit line extending from the battery 15 to the electric motors 18, 19, the robot leg control unit 11, the robot arm control unit 12, and the malfunction processing unit 13. A voltage detector 24 for detecting a voltage (hereinafter referred to as a battery voltage) across the battery 15 is connected between the anode and cathode of the battery 15. Detected values from the current detector 23 and the voltage detector 24 are used by the malfunction processing unit 13 primarily to recognize a remaining capacity of the battery 15, as described later on.

Figure 3:
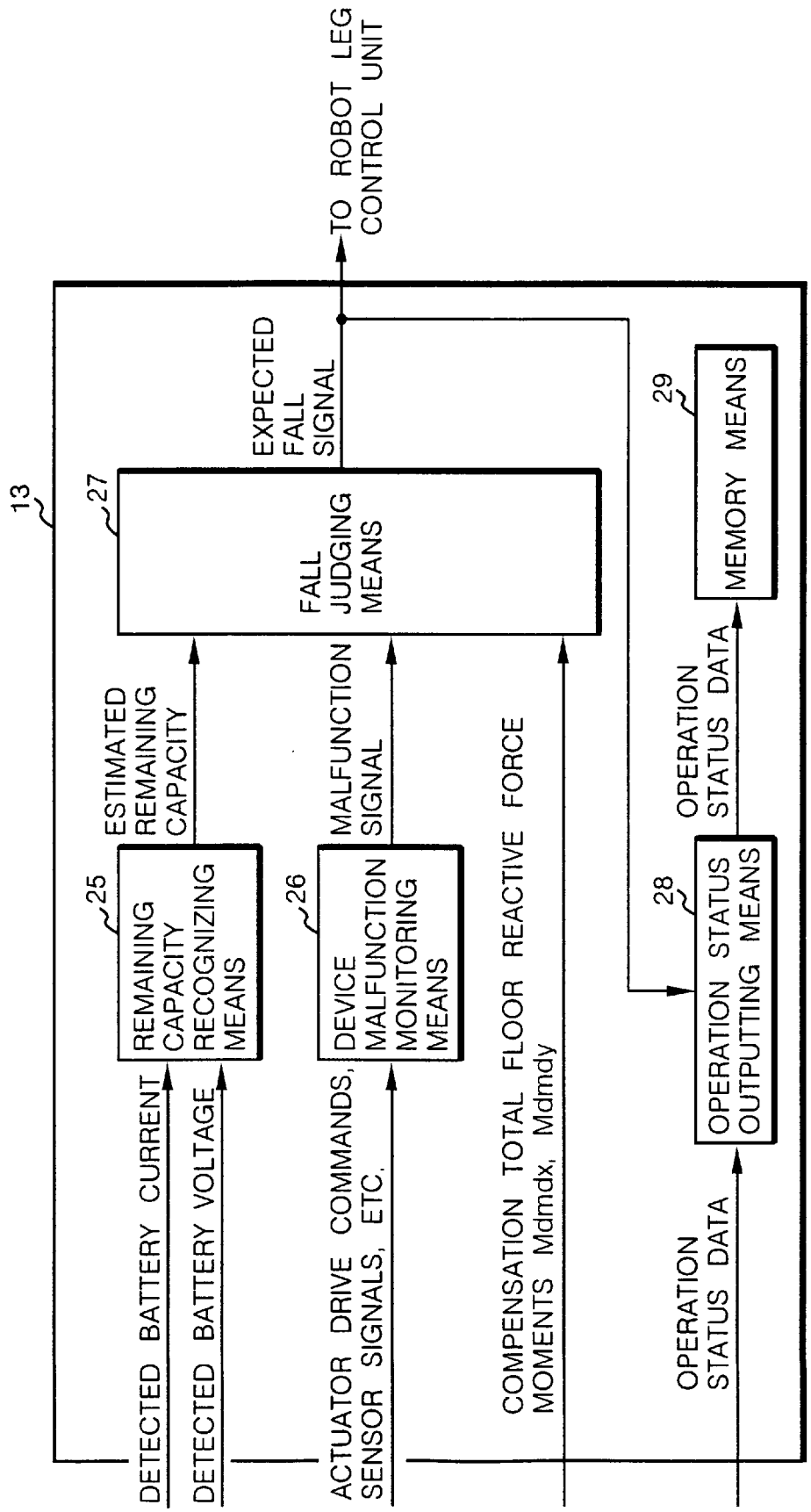
FIG. 3 is a block diagram of functions performed by a malfunction processing unit of the robot shown in FIG. 1.

As shown in FIG. 3, the malfunction processing unit 13 has, as functions to be performed thereby, a remaining capacity recognizing means 25, a device malfunction monitoring means 26, a fall judging means 27, an operation status outputting means 28, and a memory means 29.

The remaining capacity recognizing means 25 serves to recognize a remaining capacity of the battery 15. To recognize a remaining capacity of the battery 15, the remaining capacity recognizing means 25 reads, from time to time, a detected battery current from the current detector 23 and a detected battery voltage from the voltage detector 24. Then, the remaining capacity recognizing means 25 recognizes a remaining capacity of the battery 15 from the detected battery current and voltage, as follows:

The remaining capacity recognizing means 25 integrates detected values of the battery current to determine an amount of electric energy consumed from the initial stage of the battery 15, and subtracts the amount of combined electric energy from the initial capacity of the battery 15 thereby to determine a basic remaining capacity value of the battery 15. Then, the remaining capacity recognizing means 25 corrects the determined basic remaining capacity value depending on the detected value of the battery voltage to estimate and recognize a remaining capacity of the battery 15, and supplies the estimated remaining capacity to the fall judging means 27.

There are known various processes of recognizing a remaining capacity of the battery 15, and a remaining capacity of the battery 15 may be recognized by one of these known processes that is different from the process described above. For example, if no high accuracy is required in estimating a remaining capacity of the battery 15, then a remaining capacity of the battery 15 may be recognized from the data of either the detected battery current or the detected battery voltage. If a high level of accuracy is required in estimating a remaining capacity of the battery 15, then the temperature and specific gravity of the battery 15 may be detected as well as the battery current and the battery voltage, and a remaining capacity of the battery 15 may be recognized from these detected quantities.

The device malfunction monitoring means 26 serves to monitor malfunctioning of various devices (particularly those devices which operate the movable legs 3 or affect the orientation of the robot R) of the robot R, e.g., the leg actuators 5, the leg actuator displacement detectors 16, the six-axis force sensor 6, the tilt detector 14, the current detector 23, the voltage detector 24, and cables (not shown) connected to these actuators, detectors, and sensor. The device malfunction monitoring means 26 is supplied with drive commands for the leg actuators 5 which are generated by the robot leg control unit 11 as described later on, and data such as output data from the various detectors and sensor such as the leg actuator displacement detectors 16. Based on the supplied data, the device malfunction monitoring means 26 monitors the devices for their malfunction. If any of the devices malfunctions, the device malfunction monitoring means 26 supplies a malfunction signal to the fall judging means 27.

The fall judging means 27 serves to decide whether the robot R is in a state likely to cause the robot R to fall down. To make such a judgment, the fall judging means 27 is supplied with an estimated remaining capacity of the battery 15 from the remaining capacity recognizing means 25, a malfunction signal from the device malfunction monitoring means 26, and compensation total floor reactive force moments Mdmdx, Mdmdy (described later on) determined by the robot leg control unit 11 from the robot leg control unit 11.

If the estimated remaining capacity supplied from the remaining capacity recognizing means 25 drops below a predetermined value, i.e., if the estimated remaining capacity of the battery 15 is too low to possibly fail to energize the electric motors 18 of the leg actuators 5 normally, then the fall judging means 27 determines that the robot R is in a state likely to cause the robot R to fall down.

If a malfunction signal is supplied from the device malfunction monitoring means 26, then since the movable legs 3 may possibly not be operated normally, the fall judging means 27 determines that the robot R is in a state likely to cause the robot R to fall down.

If compensation total floor reactive force moments Mdmdx, Mdmdy supplied from the robot leg control unit 11 are greater than predetermined values, then the fall judging means 27 determines that the robot R is in a state likely to cause the robot R to fall down, as described later on.

When the fall judging means 27 determines that the robot R is in a state likely to cause the robot R to fall down, the fall judging means 27 supplies an expected fall signal to the operation status outputting means 28 and the robot leg control unit 11.

The operation status outputting means 28 is supplied, from time to time, with data representing an operation status of the robot R, e.g., target displacements for the leg actuators 5 and the arm actuators 8 (target rotational angles for the electric motors 18, 19), detected displacements of the leg actuators 5 and the arm actuators 8, or data (hereinafter referred to as operation status data) of a target upper body position/orientation path and a target foot position/orientation path which are generated, as described later on, in a process of determining target displacements for the leg actuators 5, from the robot leg control unit 11 and the robot arm control unit 12.

When an expected fall signal is supplied from the fall judging means 27, the operation status outputting means 28 outputs operation status data immediately prior to the expected fall signal or operation status data over a given period of time across the expected fall signal to the memory means 29.

The memory means 29 comprises a non-volatile memory such as an EEPROM (Electrically Erasable Programmable Read-only Memory), for example.

Figure 4:
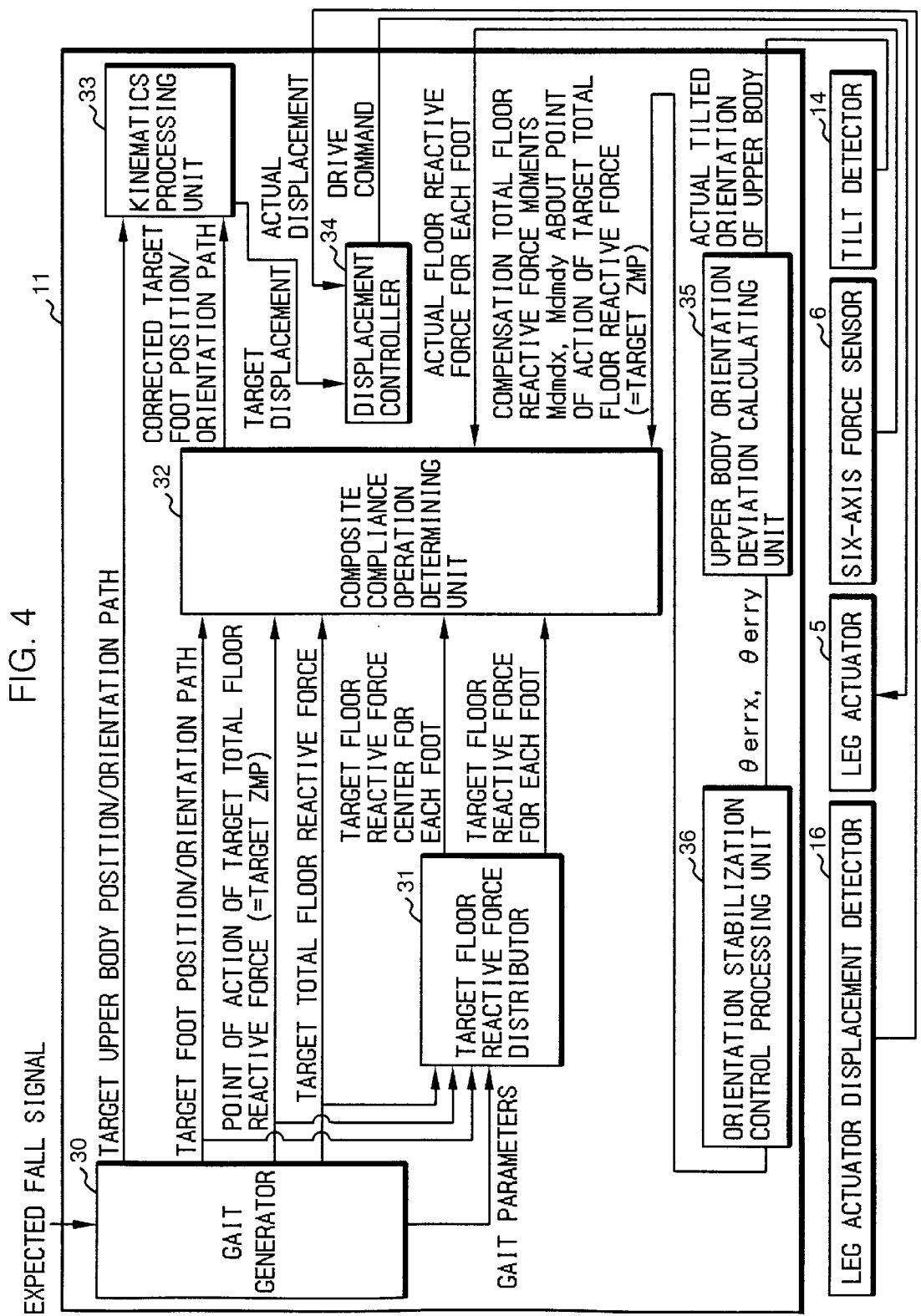
FIG. 4 is a block diagram of functions performed by a robot leg control unit of the robot shown in FIG. 1.

As shown in FIG. 4, the robot leg control unit 11 has, as functions to be performed thereby, a gait generator 30, a target floor reactive force distributor 31, a composite compliance operation determining unit 32 (foot position/orientation correcting means), a kinematics processing unit 33, a displacement controller 34, an upper body orientation deviation calculating unit 35 (upper body orientation deviation calculating means), and an orientation stabilization control processing unit 36 (orientation stabilization floor reactive force calculating means).

Details of the robot leg control unit 11 which has such functions are described in Japanese patent application No. 9-33176 or PCT international application PCT/JP98/0399 referred to above. Therefore, these functions will only briefly be described below.

The gait generator 30 serves to generate a target gait which defines basic operation patterns of each of the movable legs 3. The target gait comprises a target motion pattern, more specifically, a target upper body position/orientation path and a target foot position/orientation path, and a target floor reactive force pattern, more specifically, a target total floor reactive force center and a target total floor reactive force.

The target upper body position/orientation path is a target path for the position and orientation (spatial orientation of the upper body) of the upper body (torso 2) of the robot R. The target foot position/orientation path is a target path for the position and orientation (spatial orientation of each foot) of each foot 7 of the robot R.

A floor reactive force is represented by a translational force and a moment applied from the floor. A total floor reactive force is a sum of floor reactive forces acting on the feet 7 of the respective movable legs 3 of the robot R. The target total floor reactive force is a target value for the total floor reactive force.

A total floor reactive force center means a point of action where the total floor reactive force acts on the robot R. This point of action is defined as a point on the floor where moment components of the total floor reactive force other than the moment component about the vertical axis are zero. The target total floor reactive force center is a target position for the total floor reactive force center. The target total floor reactive force center agrees with a target position for ZMP (Zero Moment Point), i.e., a point which is a point of action where the sum of an inertial force of the robot R generated by the target motion pattern and a gravitational force acting on the robot R acts on the floor, and where the moment components other than the moment component about the vertical axis are zero.

The target floor reactive force distributor 31 determines a target floor reactive force center for each foot for each control cycle based on a target foot position/orientation path and a target total floor reactive force center which are supplied from the gait generator 30, and gait parameters which define a landing position/orientation of the foot 7 of a swing leg with respect to the foot 7 of a support leg when the robot R walks, and operating timing of each foot 7. Based on the determined target floor reactive force center for each foot and a target total floor reactive force supplied from the gait generator 30, the target floor reactive force distributor 31 determines a target floor reactive force for each foot for each control cycle.

A floor reactive force for each foot is represented by a translational force and a moment applied to each foot 7 of the robot R from the floor. The target floor reactive force for each foot is a target value for the floor reactive force for each foot. A floor reactive force center for each foot is a point of action where the floor reactive force for each foot acts on each foot 7. This point of action is defined as a point on the floor where moment components of the floor reactive force for each foot other than the moment component about the vertical axis are zero. The target floor reactive force center for each foot is a target position for the floor reactive force center for each foot.

The target floor reactive force distributor 31 determines a target floor reactive force center for each foot for each control cycle in order to satisfy certain conditions that the target total floor reactive force center will lie on a line segment interconnecting target floor reactive force centers for the respective feet during a two-leg support phase in which both feet 7 are on the floor, and the target floor reactive force center for the foot 7 of a support leg agrees with the target total floor reactive force center during a one-leg support phase in which one of the feet 7 of the robot R is off the floor. The target floor reactive force distributor 31 determines a target floor reactive force for each foot such that the sum of target floor reactive forces for the respective feet 7 will agree with the target total floor reactive force.

The upper body orientation deviation calculating unit 35 serves to calculate the difference (hereinafter referred to as an upper body orientation deviation) between a target tilted orientation (target value for a tilt angle of the upper body) for the upper body (torso 2) of the robot R for each control cycle which is determined by the target upper body position/orientation path, and an actual tilted orientation of the upper body of the robot R which is detected by the tilt detector 24. The upper body orientation deviation which is calculated is represented by a deviation θerrx about the sagittal axis of the robot R and a deviation θerry about the lateral axis of the robot R.

The orientation stabilization control processing unit 36 serves to calculate a floor reactive force (herein referred to as a compensation total floor reactive force) to be additionally applied from the floor to the robot R at a point of action which is the same as the target total floor reactive force center in directions to recover the upper body of the robot R from the actual tilted orientation to the target tilted orientation, based on the upper body orientation deviations θerrx, θerry supplied from the upper body orientation deviation calculating unit 35. In this embodiment, the directions to recover the upper body of the robot R from the actual tilted orientation are directions in which the upper body of the robot R rotates about the sagittal and lateral axes, i.e., the direction of the tilt angle. Therefore, the compensation total floor reactive force calculated by the orientation stabilization control processing unit 36 comprises a moment Mdmdx about the sagittal axis about the target total floor reactive force center and a moment Mdmdy about the lateral axis about the target total floor reactive force center. These moments Mdmdx, Mdmdy are referred to as compensation total floor reactive force moments. The orientation stabilization control processing unit 36 calculates these compensation total floor reactive force moments from the values of the upper body orientation deviations θerrx, θerry and their rates of change dθerrx/dt, dθerry/dt (rates of change in time of the upper body orientation deviations) according to the following equations (1), (2):

$$Mdmdx = -Kthx \cdot \theta errx - Kwx \cdot (d\theta Errx/dt) \qquad (1)$$

$$Mdmdy = -Kthy \cdot \theta erry - Kwy \cdot (d\theta erry/dt) \qquad (2)$$

where Kthx, Kwx, Kthy, Kwy represent predetermined gains.

The values of the compensation total floor reactive force moments Mdmdx, Mdmdy are greater as the upper body orientation deviations θerrx, θerry are greater, and are greater as the rates of change of the upper body orientation deviations θerrx, θerry in a direction for the actual tilted orientation to vary away from the target tilted orientation are greater. However, even though the upper body orientation deviations θerrx, θerry are somewhat large, the compensation total floor reactive force moments Mdmdx, Mdmdy are relatively small if the direction of the rates of change of the upper body orientation deviations θerrx, θerry is the same as the direction in which the actual tilted orientation approaches the target tilted orientation (this occurs transiently when the robot R attempts to raise the upper body toward the target tilted orientation).

The composite compliance operation determining unit 32 basically serves to correct the target foot position/orientation path in order to cause an actual total floor reactive force, which is the sum of actual floor reactive forces detected with respect to the respective feet 7 by the six-axis force sensor 6, to follow the sum of the target total floor reactive force and the compensation total floor reactive force (the compensation total floor reactive force moments Mdmdx, Mdmdy), insofar as each foot 7 can touch the floor properly.

The composite compliance operation determining unit 32 determines a corrective quantity for the target foot position/orientation path based on the target total floor reactive force center generated by the gait generator 30, the target floor reactive force center for each foot generated by the target floor reactive force distributor 31, the actual floor reactive forces detected with respect to the respective feet 7 by the six-axis force sensor 6, and the compensation total floor reactive force moments Mdmdx, Mdmdy calculated by the orientation stabilization control processing unit 36.

At the target total floor reactive force center which is the point of action of the target total floor reactive force, the moment components of the target total floor reactive force about the sagittal and lateral axes of the robot R are zero, as described above. Therefore, the moment components of the sum of the target total floor reactive force and the compensation total floor reactive force about the sagittal and lateral axes of the robot R are the same as the compensation total floor reactive force moments Mdmdx, Mdmdy. Consequently, the target foot position/orientation path is corrected in order to cause the moment components of the actual total reactive force about the sagittal and lateral axes to follow the compensation total floor reactive force moments Mdmdx, Mdmdy.

The correction of the target foot position/orientation path has no direct bearing on the present invention, and will not be described in detail below as it is described in Japanese patent application No. 9-33176 or PCT international application PCT/JP98/0399.

The composite compliance operation determining unit 32 also serves to correct the target foot position/orientation path in view of deformation of an elastic mechanism equipped with each of the feet 7 (mechanism deformation compensation). However, such correction will not be in detail below as it is also described in Japanese patent application No. 9-33176 or PCT international application PCT/JP98/0399. The target total floor reactive force and the target floor reactive force for each foot are used for such mechanism deformation compensation, and may not be determined if the mechanism deformation compensation is dispensed with.

The kinematics processing unit 33 serves to determine a target displacement for each of the leg actuators 5 for each control cycle, specifically, a target rotational angle for each of the electric motors 18 of the leg actuators 5, from a target upper body position/orientation for each control cycle in the target upper body position/orientation path generated by the gait generator 30 and a target foot position/orientation path for each control cycle in a corrected target foot position/orientation path determined by the composite compliance operation determining unit 32, according to inverse kinematics calculations based on a geometric model of the robot R.

The displacement controller 34 generates drive commands to be supplied to the amplifiers 20 for causing the actual displacements of the leg actuators 5 which are detected by the leg actuator displacement detectors 16, i.e., actual rotational angles of the electric motors 18 of the leg actuators 5, to follow the target displacements determined by the kinematics processing unit 33. The displacement controller 34 then supplies the generated drive commands to the amplifiers 20 for controlling the leg actuators 5 in a feedback control loop.

Based on the above functions of the robot leg control unit 11, each of the movable legs 3 of the robot R operates according to a target motion pattern, i.e., a target upper body position/orientation path and a target foot position/orientation path, generated by the gait generator 30. At this time, the composite compliance operation determining unit 32 corrects the target foot position/orientation path in order to generate compensation total floor reactive force moments Mdmdx, Mdmdy for recovering the upper body of the robot R from the actual tilted orientation to the target tilted orientation, about the target total floor reactive force center, so that the movable legs 3 of the robot R will operate to stabilize the orientation of the upper body of the robot R autonomously.

The robot arm control unit 12 determines target displacements for the arm actuators 8, i.e., target rotational angles for the electric motors 19 of the arm actuators 8, either by being taught in advance or according to motion patterns for the respective movable arms 4 which are commanded by communications from an external source. The robot arm control unit 12 then generates drive commands to be supplied to the amplifiers 21 for causing the actual displacements of the leg actuators 8 which are detected by the arm actuator displacement detectors 17, i.e., actual rotational angles of the electric motors 19 of the arm actuators 8, to follow the determined target displacements. The robot arm control unit 12 then supplies the generated drive commands to the amplifiers 21 for controlling the arm actuators 8 in a feedback control loop.

Target motion patterns which are generated by the gait generator 30 of the robot leg control unit 11 will be described below.

A target motion pattern generated by the gait generator 30 for the robot R to move (walk) usually and a target reactive force pattern are described in detail in Japanese patent application No. 9-33176, PCT international application PCT/JP98/0399, and PCT international publication WO98/04388, and hence will not be described in detail. A target motion pattern for the robot R to walk, for example, is generated as shown in FIG. 5.

Figure 5:
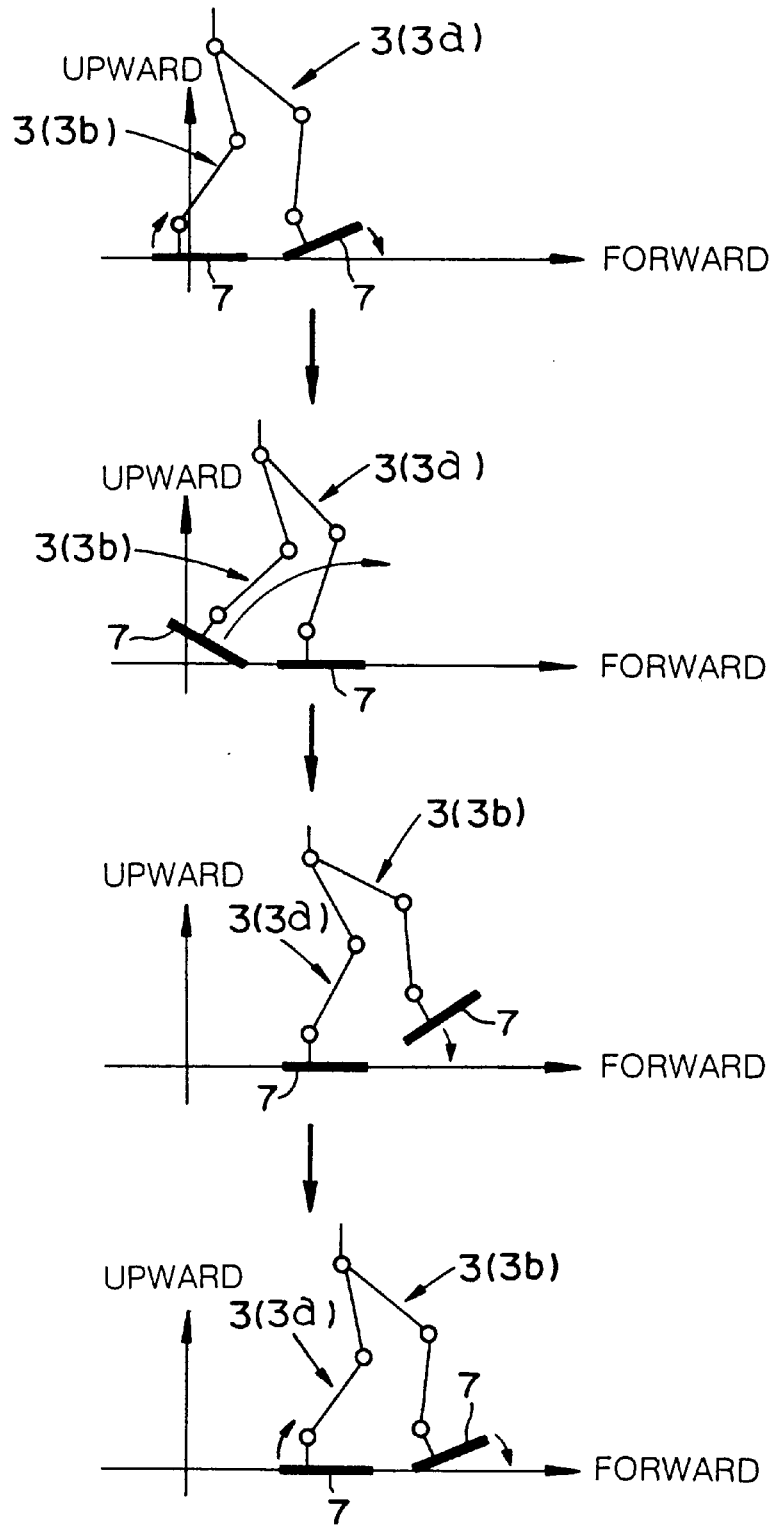
FIG. 5 is a diagram of a target motion pattern for the robot shown in FIG. 1 when it walks normally.

FIG. 5 schematically shows a motion pattern for a single step of the robot R when it walks, successively from an uppermost stage to a lowermost stage. According to the illustrated motion pattern, the foot 7 of one of the movable legs 3 (indicated by 3a) starts landing on the floor at its heel as shown in the uppermost stage, and then using the movable leg 3a as a support leg, the foot 7 of the other movable leg 3 (indicated by 3b) as a swing leg leaves the floor as shown in second and third stages. Thereafter, the foot 7 of the movable leg 3b as the swing leg is landed on the floor at its heel as shown in the lowermost stage. The motion pattern shown in FIG. 5 is basically the same as a motion pattern which is employed when a human being walks usually.

Figure 7:
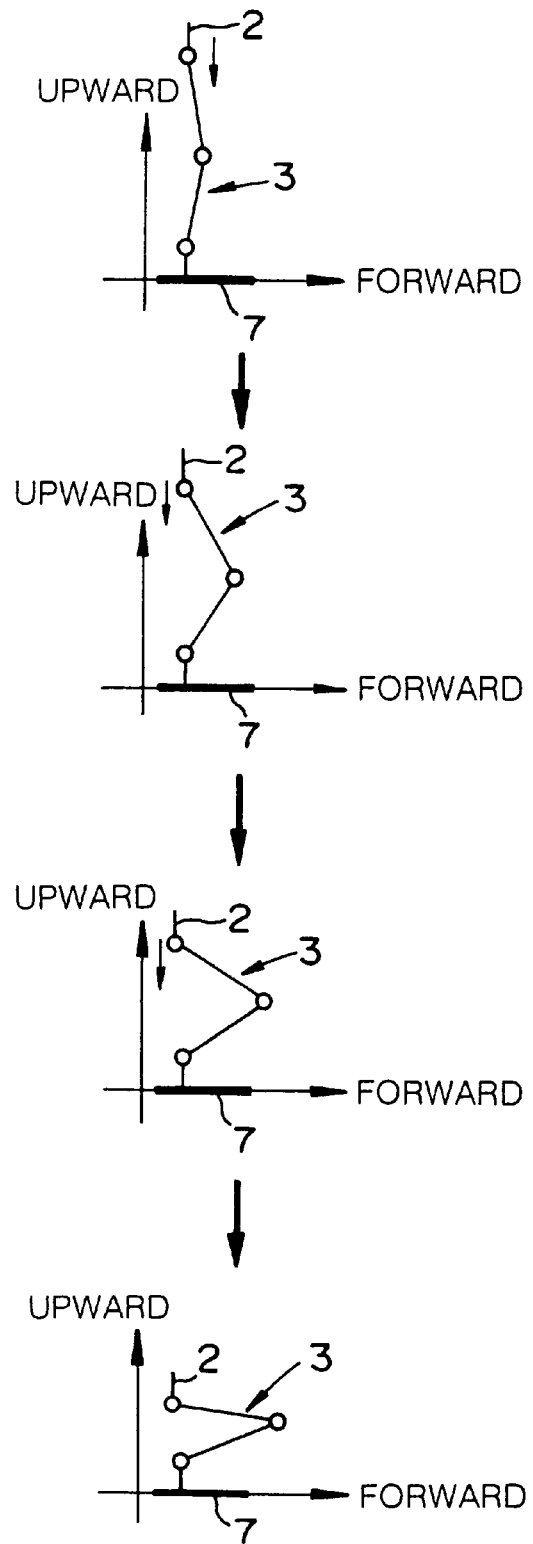
FIG. 7 is a diagram of a target motion pattern for the robot shown in FIG. 1 when it is in another situation likely to cause the robot to fall down.

According to this embodiment, when the gait generator 30 is supplied with an expected fall signal from the fall judging means 27, the gait generator 30 generates target motion patterns as shown in FIGS. 6 and 7.

FIG. 6 schematically shows a target motion pattern generated by the gait generator 30 when an expected fall signal is supplied from the fall judging means 27 to the gait generator 30 while the robot R is walking usually as shown in an uppermost stage. As successively shown in second, third, and fourth (lowermost) stages of FIG. 6, the target motion pattern is generated for the robot R to lower the center of gravity of the upper body (torso 2) by lowering its waist while leaving the movable leg 3b as the swing leg from the floor and landing it on the floor. Specifically, the gait generator 30 generates a target upper body position/orientation path for progressively lowering a target upper body position on the target upper body position/orientation path included in the target motion pattern.

FIG. 7 schematically shows a target motion pattern generated by the gait generator 30 when an expected fall signal is supplied from the fall judging means 27 to the gait generator 30 while the robot R is standing still as shown in an uppermost stage. As successively shown in second, third, and fourth (lowermost) stages of FIG. 7, the target motion pattern is generated for the robot R to lower the center of gravity of the upper body (torso 2) by lowering its waist.

The deciding process performed by the fall judging means 27 based on the compensation total floor reactive force moments Mdmdx, Mdmdy calculated by the orientation stabilization control processing unit 36 will further be described below.

As described above, the compensation total floor reactive force moments Mdmdx, Mdmdy are a floor reactive force (moments) to be additionally applied from the floor to the robot R at a point of action which is the same as the target total floor reactive force center in order to recover the upper body of the robot R from the actual tilted orientation to the target tilted orientation autonomously. The target upper body position/orientation path for the robot R and hence the actual position/orientation of each foot 7 of the robot R are basically corrected in order to generate the compensation total floor reactive force moments Mdmdx, Mdmdy about the target total floor reactive force center.

For example, when the actual tilted orientation of the robot R is being tilted forward away from the target tilted orientation, the position/orientation of the foot 7 that is landed on the floor is corrected so that the pressure from the floor will concentrate on a front region of the foot 7 (at this time, a moment (=Mdmdy) for returning the robot R to a backward tilted state about the target total floor reactive force center is generated).

However, if the compensation total floor reactive force moments Mdmdx, Mdmdy are excessively large, then it is practically difficult to correct the position/orientation of the foot 7 so as to generate the compensation total floor reactive force moments Mdmdx, Mdmdy. In such a case, the robot R is expected to fall down.

If the compensation total floor reactive force moments Mdmdx, Mdmdy exceed a predetermined value, or more specifically, if the compensation total floor reactive force moment Mdmdx or Mdmdy exceeds a predetermined value, the fall judging means 27 determines that the robot R is likely to fall down, and generates an expected fall signal.

The predetermined value used as a threshold for making the above decision should preferably be set to a value when both feet 7 of the robot R are on the floor (two-leg support phase) and to a different value when only one foot 7 is on the floor (one-leg support phase).

Specifically, in the two-leg support phase, even though compensation total floor reactive force moments Mdmdx, Mdmdy are relatively large, they can be generated about the target total floor reactive force center by correcting the position/orientation of the feet 7. In the one-leg support phase, however, since compensation total floor reactive force moments Mdmdx, Mdmdy are generated about the target total floor reactive force center by correcting the position/orientation of one foot 7 only, the compensation total floor reactive force moments Mdmdx, Mdmdy that can be generated are smaller than those in the two-leg support phase.

In this embodiment, therefore, the predetermined value to be compared with the compensation total floor reactive force moments Mdmdx, Mdmdy for the fall judging means 27 to make a decision is set to different values respectively in the two-leg support phase and the one-leg support phase, the value in the two-leg support phase being greater than the value in the one-leg support phase.

The compensation total floor reactive force moments Mdmdx, Mdmdy that can be generated by correcting the position/orientation of the feet 7 are generally different from each other depending on the shape of the feet 7. Consequently, respective values may be established for comparison with the compensation total floor reactive force moments Mdmdx, Mdmdy.

Operation of the control system according to the first embodiment of the present invention, particularly when the fall judging means 27 determines that the robot R is likely to fall down, will be described below.

As described above, when the estimated remaining capacity of the battery 15 supplied from the remaining capacity recognizing means 25 drops below a predetermined value, or the malfunction signal is supplied from the device malfunction monitoring means 26, or the compensation total floor reactive force moment Mdmdx or Mdmdy supplied from the orientation stabilization control processing unit 36 is greater than the predetermined value corresponding to the landed state of the feet 7, the fall judging means 27 determines that the robot R is likely to fall down, and supplies an expected fall signal to the operation status outputting means 28 and the robot leg control unit 11 (specifically the gait generator 30).

The gait generator 30 generates a target motion pattern for lowering the center of gravity of the upper body (torso 2) of the robot R by lowering its waist, as shown in FIG. 6 or 7. The various functions of the robot leg control unit 11 are performed as described above to operate the movable legs 3 basically according to the target motion pattern for thereby operating the robot R to lower its waist.

As a result, the center of gravity of the robot R is lowered. Even if the robot R subsequently turns over and collides with an object such as the floor, any shock which the robot R or the object suffers is relatively small, and hence any damage caused to the robot R or the object is also relatively small. Since the fall judging means 27 determines that the robot R is likely to fall down under the conditions described above, the fall judging means 27 can make such a decision accurately, and hence can lower the center of gravity of the robot R with accurate timing.

The operation status outputting means 28 of the malfunction processing unit 13 outputs operation status data of the robot R immediately prior to the expected fall signal from the fall judging means 27 or over a given period of time across the expected fall signal fall judging means 27, to the memory means 29, which stores the supplied operation status data.

In this embodiment, subsequent to the above process, the robot leg control unit 11 and the robot arm control unit 12 control the leg actuators 5 and the arm actuators 8, respectively, to stop moving the movable legs 3 and the movable arms 4 of the robot R.

Since the robot R is moved as described above when the estimated remaining capacity of the battery 15 which is recognized by the remaining capacity recognizing means 25 drops below a predetermined value, the following advantages are achieved:

Because the robot R operates to lower its center of gravity, the potential energy of the robot R is reduced. Generally, therefore, some of the electric motors 18 of the leg actuators 5 of the movable legs 3 are rotated by the weight of the robot R in a regenerative mode. Since the regenerated electric energy is supplied through the corresponding amplifiers 20 to the battery 15, it charges the battery 15 or is stored in the capacitor 22. The regenerated electric energy, therefore, can be used as electric power for the electric motors 18, the robot leg control unit 11, and the malfunction processing unit 13. As a result, even if the remaining capacity of the battery 15 is small, the robot R can be operated to lower the center of gravity thereof as sufficiently as possible for reducing any shock that is produced when the robot R turns over, and the operation status outputting means 28 can be operated to store the operation status data of the robot R into the memory means 29 as sufficiently as possible.

Inasmuch as the operation status data of the robot R is stored in the non-volatile memory means 29, when the battery 15 is subsequently charged for operating the robot R again, the robot R can be operated again from the state prior to its possible fall, using the operation status data stored in the memory means 29. It is also possible to analyze the cause of the malfunction or failure of the robot R with the operation status data stored in the memory means 29.

A control system according to a second embodiment of the present invention will be described below with reference to FIG. 8. The control system according to the second embodiment differs from the control system according to the first embodiment as to certain structural details and functions. Those parts of the control system according to the second embodiment which are identical to those of the control system according to the first embodiment are denoted by identical reference numerals, and will not be described in detail below.

Figure 8:
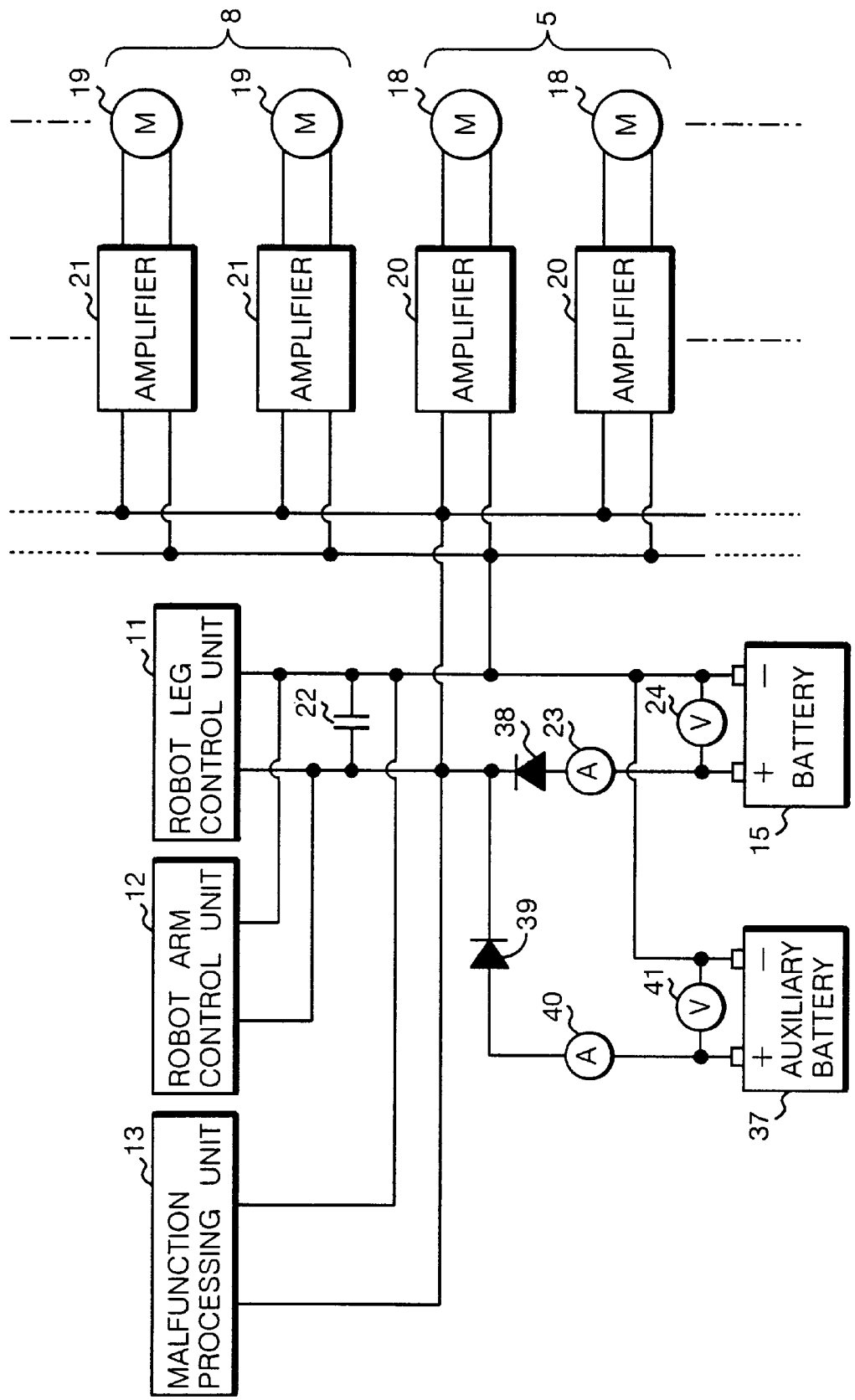
FIG. 8 is a block diagram of an electrically connected arrangement of a battery, amplifiers, electric motors, etc. of a legged moving robot, i.e., a biped locomotion robot, which is controlled by a control system according to a second embodiment of the present invention.

In FIG. 8, the battery 15 and an auxiliary battery 37 as an auxiliary power supply are housed in the torso 2 of the robot R. Diodes 38, 39 for preventing a current from flowing into the battery 15 and the auxiliary battery 37 are connected respectively to the anodes of these batteries 15, 37. The amplifiers 20, 21, the robot leg control unit 11, the robot arm control unit 12, the malfunction processing unit 13, and the capacitor 22 are connected through the diodes 38, 39 to the batteries 15, 37. Electric energy generated by the electric motors 18, 19 in a regenerative mode is not supplied to the batteries 15, 37, but stored in the capacitor 22. The voltage across the auxiliary battery 37 in the usual mode is slightly lower than the voltage across the battery 15 in the usual mode. In the second embodiment, the capacitor 22 comprises a capacitor having a relatively large capacitance, such as an electric double-lay er capacitor.

A current detector 40 for detecting a current flowing into the auxiliary battery 37 is connected to the anode of the auxiliary battery 37, and a voltage detector 41 for detecting a voltage across the auxiliary battery 37 is connected between the anode and cathode of the auxiliary battery 37. The remaining capacity recognizing means 25 of the malfunction processing unit 13 serves to recognize a remaining capacity of the battery 15 from output data from the current detector 23 and the voltage detector 24, as described above with reference to the first embodiment, and also to recognize a remaining capacity of the auxiliary battery 37 from output data from the current detector 40 and the voltage detector 41. The fall judging means 27 of the malfunction processing unit 13 serves to generate an expected fall signal when both the remaining capacities of the batteries 15, 37 which are recognized by the remaining capacity recognizing means 25 drop below a predetermined value.

Other structural details and functions of the control system according to the second embodiment are identical to those of the control system according to the first embodiment.

According to the second embodiment, when both the remaining capacities of the batteries 15, 37 drop below a predetermined value, fall judging means 27 generates an expected fall signal, and supplies the generated expected fall signal to the gait generator 30 of the robot leg control unit 11. Then, the robot R operates to lower its center of gravity, as with the first embodiment.

Regenerated electric energy from the electric motors 18 of the leg actuators 5 is supplied through the corresponding amplifiers 20 and stored in the capacitor 22. The regenerated electric energy, therefore, can be used as electric power for the electric motors 18, the robot leg control unit 11, and the malfunction processing unit 13. As a result, even if the remaining capacity of the batteries 15, 37 is small, the robot R can be operated to lower the center of gravity thereof as sufficiently as possible for reducing any shock that is produced when the robot R turns over, and the operation status outputting means 28 can be operated to store the operation status data of the robot R into the memory means 29 as sufficiently as possible.

The regenerated electric energy from the electric motors 18 is prevented from charging the batteries 15, 37 by the diodes 38, 39, but is stored in the capacitor 22. Consequently, the regenerated electric energy can effectively be used to enable the robot R to lower the center of gravity thereof as sufficiently as possible and also to enable the operation status outputting means 28 to store the operation status data of the robot R into the memory means 29 as sufficiently as possible.

Specifically, when the batteries 15, 37 are charged, they generally cause an energy loss. However, the capacitor 22 brings about a relatively small energy loss when it is charged. Since the regenerated electric energy is not supplied to charge the batteries 15, 37, but is stored in the capacitor 22, as described above, the electric energy stored in the capacitor 22 can effectively be used to cause the robot R to lower the center of gravity thereof and also to cause the operation status outputting means 28 to store the operation status data of the robot R into the memory means 29.

Figure 9:
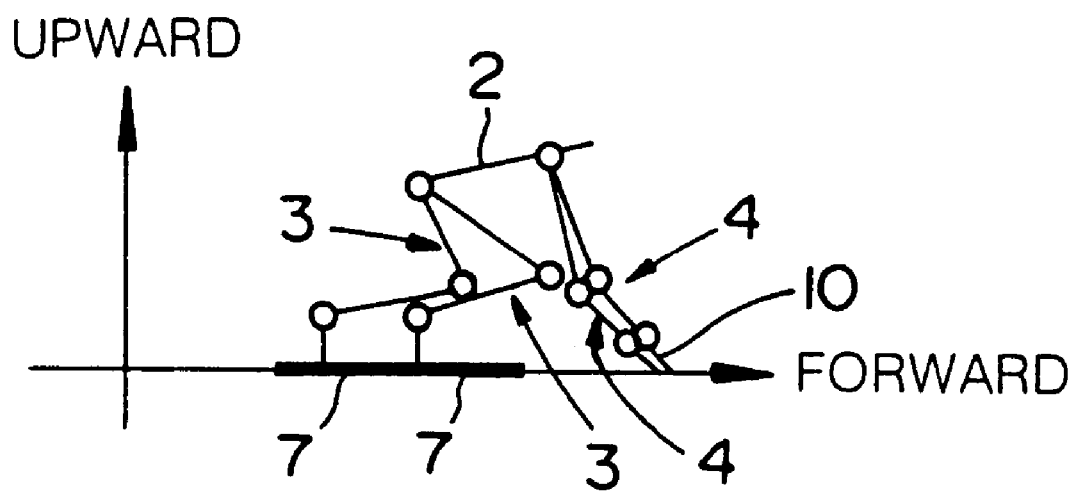
FIG. 9 is a diagram of a motion pattern of a legged moving robot, i.e., a biped locomotion robot, which is controlled by a control system according to a third embodiment of the present invention when the robot is in a situation likely to cause the robot to fall down.

A control system according to a third embodiment of the present invention will be described below with reference to FIG. 9. The control system according to the third embodiment differs partly from the control system according to the first embodiment. Those parts of the control system according to the third embodiment which are identical to those of the control system according to the first embodiment are denoted by identical reference numerals, and will not be described in detail below.

In the third embodiment, the malfunction processing unit 13 supplies an expected fall signal which is generated by the fall judging means 27 when it determines that the robot R is likely to fall down, to the robot leg control unit 11 and also to the robot arm control unit 12. When supplied with an expected fall signal from the fall judging means 27, the robot leg control unit 11 and the robot arm control unit 12 operate the robot R as shown in FIG. 9, for example. Specifically, the robot leg control unit 11 controls the leg actuators 5 to lower the center of gravity of the robot R by lowering its waist, and the robot arm control unit 12 controls the arm actuators 8 to lower the hand 10 of each movable arm 10 toward the floor until the hand 10 touches the floor.

Other structural details and functions of the control system according to the third embodiment are identical to those of the control system according to the first embodiment.

In the third embodiment, when the robot R is in a situation likely to cause a fall of the robot R, the movable legs 3 move to lower the center of gravity of the robot R, and the movable arms 4 move into touch with the floor. Therefore, any shock which the robot R suffer when it turns over can be lessened.

In each of the above embodiments, one condition for determining that the robot R is likely to fall down is to decide whether the compensation total floor reactive force moment Mdmdx or Mdmdy is greater than a predetermined value corresponding to the landed state of the foot 7 or not. However, either of the following conditions may instead be employed to make such a decision.

It is decided whether the upper body orientation deviations θerrx, θerry are greater than a predetermined value or not, and it is determined that the robot R is likely to fall down if either one of the upper body orientation deviations θerrx, θerry is greater than the predetermined value.

Alternatively, it is decided whether the rates of change dθerrx/dt, dθerry/dt (rates of change in time) of the upper body orientation deviations are greater than a predetermined value or not in the direction for the actual tilted orientation of the upper body of the robot R to deviate from to the target tilted orientation or not, and it is determined that the robot R is likely to fall down if either one of the rates of change dθerrx/dt, dθerry/dt is greater than the predetermined value.

Further alternatively, if either one of the upper body orientation deviations θerrx, θerry is greater than the predetermined value, and also if the rates of change dθerrx/dt, dθerry/dt (rates of change in time) of the upper body orientation deviations are greater than the predetermined value or not in the direction for the actual tilted orientation of the upper body of the robot R to deviate from to the target tilted orientation, then it is determined that the robot R is likely to fall down.

Still alternatively, it is decided whether the value of a weighted mean of the upper body orientation deviations θerrx, θerry and their rates of change dθerrx/dt, dθerry/dt is greater than a predetermined value or not (this is equivalent to deciding whether the compensation total floor reactive force moment Mdmdx or Mdmdy is greater than a predetermined value or not, with the gains Kthx, Kwx, Kthy, Kwy in the equations (1), (2) correspond to the weight), and it is determined that the robot R is likely to fall down if the value of the weighted mean is greater than the predetermined value.

For making the above decisions, the predetermined value to be compared with upper body orientation deviations θerrx, θerry, their rates of change dθerrx/dt, dθerry/dt, or the value of their weighted mean should preferably be set to different values in the two-leg support phase and the one-leg support phase.

In each of the above embodiments, the robot R is capable of stabilizing its orientation autonomously to a certain extent. However, the present invention is also applicable to those robots which do not have such a capability, and also to those robots which have a plurality of movable legs more than two legs.

In each of the above embodiments, only when the remaining capacity of the battery becomes small, or when any of the various devices of the robot malfunctions, or when the compensation total floor reactive force moment Mdmdx or Mdmdy for recovering the tilted orientation of the upper body of the robot to the target tilted orientation is greater than the predetermined value corresponding to the landed state of the foot 7 (stated otherwise, when the tilted orientation of the robot deviates relatively widely from the target tilted orientation or when tilted orientation of the robot is deviating from the target tilted orientation at a relatively large rate), it is determined that the robot is likely to fall down. However, the robot may be judged as being likely to fall down when load sensors or the like mounted on the movable legs detect the landing of the movable legs on a floor having unexpected surface irregularities or a soft floor.

In each of the above embodiments, the operation status data immediately before the robot is likely to fall down or the operation status data over a given period of time across the time when the robot is likely to fall down is supplied to and stored in the non-volatile memory means 29 on the robot R. However, the operation status data may be stored in a suitable memory means external to the robot R. For storing the operation status data into such an external memory means, a radio communication unit is mounted on the robot R, and when the robot R is judged as being likely to fall down, the operation status data is transmitted from the robot R through the radio communication unit. The transmitted operation status data is received by a radio reception unit spaced from the robot R, and stored in the external memory means associated with the radio reception unit. The external memory means may not be of a non-volatile nature.

Although certain preferred embodiments of the present invention have been shown and described in detail, it should be understood that various changes and modifications may be made therein without departing from the scope of the appended claims.

What is claimed is:

1. A control system for controlling a legged moving robot having
    an upper body, and
    a plurality of movable legs extending downwardly from said upper body and having
    actuators associated respectively with joints thereof,
    said control system comprising:
        knee joint actuators associated with the joints of said movable legs,
        fall judging means for deciding whether the robot is likely to fall down while the robot is operating; and
        actuator control means for concurrently controlling said knee joint actuators associated respectively with said joints of said plurality of movable legs to lower the center of gravity of the robot when said fall judging means determines that the robot is likely to fall down;
        said knee joint actuators and said actuator control means for controlling said knee joints cooperating to lower the center of gravity of said upper body by lowering said upper body of said robot; with
        a knee joint actuator being operably associated with a knee joint of each of said plurality of movable legs and with said actuator control means being operable to concurrently actuate said knee joints of said plurality of movable legs to effect said lowering of said upper body, with
            said knee joints being concurrently lowered, thereby lowering said upper body said robot.

2. A control system according to claim 1, wherein the robot has a battery, and each of said actuators comprises an electric actuator energizable by said battery, further comprising remaining capacity recognizing means for recognizing a remaining capacity of the battery, said fall judging means comprising means for determining that the robot is likely to fall down when the remaining capacity of the battery as recognized by said remaining capacity recognizing means is lower than a predetermined level.

3. A control system according to claim 2, wherein each of said electric actuators is connected to said battery such that electric energy regenerated by said electric actuators when said electric actuators are controlled by said actuator control means to lower the center of gravity of the robot is supplied to charge said battery.

4. A control system according to claim 2, further comprising a capacitor connected between the anode and cathode of said battery through a diode connected to prevent a current from flowing from said capacitor into said battery, wherein each of said electric actuators is connected to said capacitor such that electric energy regenerated by said electric actuators when said electric actuators are controlled by said actuator control means to lower the center of gravity of the robot is stored in said capacitor.

5. A control system according to claim 3 or 4, further comprising non-volatile memory means on said robot or memory means external to said robot, and operation status outputting means for outputting, to said memory means, operation status data of the robot immediately before or across a time when said actuator control means controls said actuators to lower the center of gravity of the robot.

6. A control system according to claim 1, further comprising device malfunction monitoring means for monitoring devices on said robot for malfunctioning, said fall judging means comprising means for determining that the robot is likely to fall down when any one of the devices on said robot is recognized by said device malfunction monitoring means.

7. A control system according to claim 1, further comprising:
    upper body tilted orientation detecting means for detecting a tilted orientation of the upper body of said robot; and
    upper body orientation deviation calculating means for calculating a deviation between the tilted orientation of the upper body of said robot as detected by said upper body tilted orientation detecting means and a target tilted orientation for the upper body of said robot which is established to cause said robot to effect a predetermined motion;
    said fall judging means comprising means for determining that the robot is likely to fall down when said deviation as calculated by said upper body orientation deviation calculating means is greater than a predetermined value.

8. A control system according to claim 1, further comprising:
    upper body tilted orientation detecting means for detecting a tilted orientation of the upper body of said robot; and
    upper body orientation deviation calculating means for calculating a deviation between the tilted orientation of the upper body of said robot as detected by said upper body tilted orientation detecting means and a target tilted orientation for the upper body of said robot which is established to cause said robot to effect a predetermined motion;
    said fall judging means comprising means for determining that the robot is likely to fall down when a rate of change in time of said deviation as calculated by said upper body orientation deviation calculating means is greater than a predetermined value in a direction for the tilted orientation of the upper body of said robot to deviate from said target tilted orientation.

9. A control system according to claim 1, further comprising:
    upper body tilted orientation detecting means for detecting a tilted orientation of the upper body of said robot; and upper body orientation deviation calculating means for calculating a deviation between the tilted orientation of the upper body of said robot as detected by said upper body tilted orientation detecting means and a target tilted orientation for the upper body of said robot which is established to cause said robot to effect a predetermined motion;

said fall judging means comprising means for determining that the robot is likely to fall down when the value of a weighted mean of said deviation as calculated by said upper body orientation deviation calculating means and a rate of change in time of said deviation is greater than a predetermined value.

10. A control system according to claim 1, further comprising:

upper body tilted orientation detecting means for detecting a tilted orientation of the upper body of said robot;

upper body orientation deviation calculating means for calculating a deviation between the tilted orientation of the upper body of said robot as detected by said upper body tilted orientation detecting means and a target tilted orientation for the upper body of said robot which is established to cause said robot to effect a predetermined motion;

orientation stabilization floor reactive force calculating means for calculating a floor reactive force to be applied from a floor to said robot through said movable legs to return the tilted orientation of the upper body of said robot to said target tilted orientation based on said deviation as calculated by said upper body orientation deviation calculating means; and foot position/orientation correcting means for correcting a position and/or an orientation of each of feet of said movable legs based on the floor reactive force as calculated by said orientation stabilization floor reactive force calculating means;

said fall judging means comprising means for determining that the robot is likely to fall down when the floor reactive force as calculated by said orientation stabilization floor reactive force calculating means is greater than a predetermined value.

11. A control system according to claim 1, wherein said robot has a movable arm with an actuator associated with a joint thereof, further comprising means for controlling said actuator of the movable arm to bring said movable arm into touch with a floor when said fall judging means determines that the robot is likely to fall down.

* * * * *